Patented Feb. 12, 1946

2,394,843

UNITED STATES PATENT OFFICE 2,394,843

COATING MATERIAL AND COMPOSITION

Giles B. Cooke and Frank J. Gavin, Baltimore, Md., assignors to Crown Cork & Seal Company, Inc., Baltimore, Md., a corporation of New York No Drawing. Application February 4, 1942, Serial No. 429,572

9 Claims. (Cl. 106—290)

This invention relates to aluminum coated mica particles and to a coating composition manufactured therefrom. The invention relates more particularly to the production of aluminum coated mica which may be advantageously used as a pigment in coating compositions, such as paints, varnishes, and the like.

It is the principal object of this invention to produce discrete particles of mica having on their surfaces, a thin coating of aluminum.

It is a further object of the invention to produce aluminum coated mica particles which are particularly well adapted to be used as a pigment in a coating composition where an aluminum finish is desired.

It is also an object of the present invention to provide a method of manufacturing aluminum coated mica particles which are particularly well suited for use as a pigment in coating compositions. This method comprises mixing mica particles and aluminum powder and subjecting the mixture to an impaction force as by a movable element to wipe the mica on its surfaces with aluminum and coat the mica.

It is a further object of our invention to provide a coating composition using as a pigment the pre-coated mica of this invention.

It has been well known in the past, in preparing aluminum coating compositions, to use as a pigment, in addition to the aluminum pigment, particles of mica. These particles of mica have been found to have leafing properties which substantially enhance the leafing property of the aluminum pigment. The mica pigment, in view of its additional leafing properties and its bulk, is a very good extender in the manufacture of aluminum coating compositions. That is to say, when mica pigment is added to the aluminum pigment in the production of aluminum coating compositions, it is possible to reduce the amounts of aluminum pigment necessary to obtain sufficient coverage and a satisfactory aluminum finish or gloss.

We have found that the coating compositions produced according to the prior art described above and using as a pigment, a mixture of discrete aluminum particles and discrete mica particles have certain disadvantages. The use of a mixture of two pigment powders, such as mica and aluminum, having slightly different densities and leafing qualities, dispersed in the same varnish or paint vehicle is undesirable. It is also undesirable to have particles of mica pigment and particles of aluminum pigment abutting each other in the coating, inasmuch as the affinity of mica for aluminum is such that a good bond is not obtained between the two pigments when the coating composition is applied and the solvent evaporated. This results in a coating which, when applied to metal that is afterwards fabricated or manipulated, tends to fracture and crack because the mica particles tend to separate from the aluminum particles. With a view to overcoming these objections, we have found that discrete mica particles may be coated with aluminum, and that the leafing properties of the mica and aluminum will not be affected. Therefore, using as a pigment, aluminum coated mica, we obtain a single pigment powder, having one density and one leafing quality, dispersed in the varnish vehicle or solvent. We are thus enabled to make a more perfect adjustment of the varnish or paint vehicle solvent to the pigment, and as a result, a more permanent dispersion of the pigment and leafing agent used may be obtained. Also, by using aluminum coated mica particles as a pigment in the paint or varnish, we obtain a metal-to-metal contact between the individual particles of pigment. The resultant coating, when the solvent is evaporated, is considerably stronger and more durable, in view of the stronger and more adherent bond between the adjoining aluminum surfaces, as distinguished from the bond between mica particles and aluminum particles.

We have also found that an aluminum paint or varnish using as a pigment, aluminum coated mica obtained by the method of this invention, is more economical to produce, in view of the very small amount of aluminum used. It is possible to obtain a good aluminum finish having desirable gloss and leafing property with a proportion of about 20 parts of aluminum to 80 parts of mica when the aluminum is pre-coated upon the mica particles.

In carrying out the present invention, we propose to mix discrete particles of mica, together with aluminum powder, and subject the mixture to an impaction force by a movable element to wipe the mica on its surfaces with aluminum and coat the mica. A ball mill is one suitable means for carrying out the present invention. It is desirable that the mica particles be not previously coated or treated with a leafing agent, such as stearic acid. In our preferred procedure, we use a very small percentage of aluminum to a large percentage of mica, the proportions being 20 parts of aluminum powder to 80 parts of mica particles. When the mixture is agitated in a ball mill, the force of the heavy ball tends to wipe the aluminum onto the mica surface. This is due to the fact that the mica is considerably harder than the aluminum, and the aluminum will, therefore, be forced to flow or wipe upon the surface of the mica. The mixture of mica particles and aluminum powder is then agitated and ground in the ball mill until aluminum coated mica particles are obtained.

While we have described above, a dry process for grinding together aluminum and mica particles until an aluminum coated mica product is obtained, it is a preferred method of our invention to grind the mica particles and aluminum powder together in a wet grinding process, in which a solvent or dispersing medium, such as kerosene or Solvesso, is used. The function of the wet grinding solvent is to provide a medium in which the discrete particles of mica and aluminum may be suspended and maintained dispersed, thereby speeding up the operation and preventing the caking of mica and aluminum. The grinding medium also acts as a lubricant, prevents overheating and reduces the fire hazard when carrying out the grinding process. If at any time during the grinding operation it is desirable to add a leafing agent to the mixture, the wet grinding solvent will also act as a solvent or dispersing medium to carry the leafing agent throughout the mixture.

When using the wet grinding process, we have found that it is preferable to use a wet grinding agent which is the same as or compatible with the solvent and base used in the paint or varnish employing the aluminum coated mica pigment of this invention. By using as a wetting and dispersing medium during the grinding operation an agent which is the same, or acts in substantially the same manner, as the solvent in the final composition, it is possible to obtain a solvent action from this dispersing agent when the coated mica is incorporated in the final composition.

The selection of the dispersing or wetting agent for the grinding operation will depend upon the composition into which the aluminum coated mica is to be incorporated. The Solvesso and kerosene are suitable agents for the grinding operation when the coated mica is to be incorporated in various types of varnishes, for example, those having bases consisting of rezyl resin or phenolic resin, or maleic amberol.

As one example of a coating composition in which this pigment may be incorporated, the following are given:

| | Parts by weight |
|---|---|
| #387-2 rezyl resin | 325 |
| Solvesso #3 | 219 |
| Kerosene | 79 |
| Aluminum coated mica | 84 |

It will be noted that the above coating composition includes as a solvent both Solvesso and kerosene. Therefore, when producing the aluminum coated mica to be used in the above coating composition, we would use as the wet grinding solvent or dispersing medium one of these solvents or a mixture of the two. We have found that a mixture of 30% kerosene and 70% Solvesso is satisfactory. Solvesso #3 as used in this example is a petroleum solvent mixture containing a high percentage of aromatics and more particularly comprises a mixture of toluene and xylene. The #387-2 rezyl resins are determined as long oil alkyds which are compatible with chlorinated rubber. It is necessary to use approximately 100 gallons of solvent for each 100 pounds of the mixture of aluminum powder and mica in the ball mill. The mica and aluminum mixture, together with the wet grinding solvent mixture, are ground in the ball mill until the desired aluminum coated mica particles are obtained.

It is to be understood that although we have particularly disclosed for wet grinding a mixture of Solvesso and kerosene, we do not wish to be limited to such solvent mixture or proportions thereof as it is possible to use as a wet grinding solvent any liquid that is the same as, or compatible with, the solvent and the base of the coating composition employing the pigments of our invention.

As another example of an aluminum coating in which the aluminum coated mica of this invention may be used for a pigment, the following coating composition is given:

| | Parts by weight |
|---|---|
| Xylol | 200 |
| Chlorinated rubber | 12.5 |
| Duraplex C-49-S | 35.5 |
| Aluminum coated mica | 38.0 |

The aluminum coated mica pigment for the above coating composition may be obtained by wet grinding of the aluminum and mica in the presence of a wet grinding solvent, such as xylol or Solvesso #2, or a mixture of both. The above wet grinding solvents are compatible with the solvent for the above coating composition. The resins designated as Duraplex C-49-S are long oil alkyds compatible with chlorinated rubber.

A further example of a coating composition employing the aluminum coated mica pigment of this invention follows:

| | Parts by weight |
|---|---|
| Vinylite resin | 90 |
| Toluene | 12 |
| Methylisopropyl ketone | 225 |
| Aluminum coated mica | 45 |

The aluminum coated mica pigment for this coating composition may be obtained by wet grinding of aluminum and mica in the presence of a solvent, such as toluene or methylisopropyl ketone, or a mixture of both. These wet grinding solvents are also compatible with the solvent in this coating composition.

The aluminum powder and mica particles used in accordance with this invention are preferably those which have not been previously treated with a leafing agent, such as stearic acid. However, it is possible to enhance the leafing properties of the aluminum coated mica with a leafing agent, and we have found that a suitable method is to add a leafing agent to the mixture in the wet grinding process near the end of the grinding process. We do not prefer to add the leafing agent to the mixture at the start of the grinding process, although it is possible to do so, because too much of the leafing agent will be dissolved in the solvent and not enough of it will act directly on the mica and aluminum to impart leafing qualities. Any desired leafing agent may be added, such as stearic acid, castor oil, or sperm oil, and these substances are all soluble in the wet grinding solvent, such as the mixture of Solvesso and kerosene which we have disclosed.

Instead of adding the leafing agent near the end of the wet grinding process as mentioned above, we may completely carry out the grinding process using kerosene as a wet grinding solvent until the mica is coated with aluminum. The kerosene wet grinding solvent may then be filtered from the aluminum coated mica and the product thoroughly dried so that the coated mica will be substantially free of solvent before it is polished with the leafing agent. A leafing agent, such as stearic acid or the like, may be added in a conventional dry polishing mill. After the leafing agent has been added, the product is ready for use as a pigment in aluminum coating compositions. This process possesses the advantages of wet grinding, such as a more rapid coating of the aluminum to the mica particle with less explosion risk, and also possesses the advantages of the dry grinding process, in that the leafing agent is introduced during the dry polishing and is not partially removed by the solvent used in wet grinding. It is well known in the aluminum powder industry that wet grinding proceeds better in kerosene than in solvents of the alcohol, ketone, and chlorinated hydrocarbon types.

We have described above, the preferred proportions of aluminum and mica used according to this method of obtaining aluminum coated mica, but it is possible to vary the proportions over a wide range. When it is desired to obtain a rapid coating of aluminum on mica by the ball mill method, a high percentage of coarse aluminum powder, for example, 70%, could be mixed with 30% of fine mica particles. As soon as the mica is completely coated, the remaining coarse aluminum, not coated to the mica, may be separated by screening. Varying the proportions of mica and aluminum will give varying results in the speed of the process and the quality of the aluminum coated mica obtained. The preferred procedure, as previously mentioned, however, is to use a very small percentage of aluminum powder, about 20%, so that the resultant product will consist mainly of mica having a thin coating of aluminum.

While we have specifically disclosed the ball mill method of producing aluminum coated mica, it is to be understood that we claim as new, the aluminum coated mica particle which may be obtained by other procedures than the ball mill grinding method.

The term "wet grinding solvent" in the appended claims is intended to mean any liquid suspension or dispersion medium which will act to suspend or disperse the individual particles of mica and aluminum during the grinding operation and tend to lubricate the same.

We claim:

1. The method of making aluminum coated mica particles, comprising the steps of mixing mica particles and aluminum powder in a ball mill, and thereafter grinding the mixture until the mica particles are coated with aluminum.

2. The method of making aluminum coated mica particles, comprising the steps of mixing mica particles and aluminum powder in a ball mill, and thereafter wet grinding the mixture until the mica particles are coated with aluminum.

3. The method of making aluminum coated mica particles, comprising the steps of mixing mica particles and aluminum powder in a ball mill, adding to the mixture a wet grinding solvent, and thereafter grinding the mixture until the mica particles are coated with aluminum.

4. The method of making a pigment for coating compositions, including a solvent vehicle, comprising the steps of mixing mica particles and aluminum powder in a ball mill, adding to the mixture a wet grinding solvent which is not incompatible with the solvent vehicle in the coating composition, and thereafter grinding the mixture until the mica particles are coated with aluminum.

5. The method of making aluminum coated mica particles, comprising the steps of mixing mica particles and aluminum powder in a ball mill, adding to the mixture a wet grinding solvent including a leafing agent, and thereafter grinding the mixture until the mica particles are coated with aluminum.

6. The method of making aluminum coated mica particles comprising the steps of mixing mica particles and aluminum powder in a ball mill, adding to the mixture a wet grinding solvent and grinding the mixture until the mica particles are coated with aluminum, removing the wet grinding solvent and adding a leafing agent to the mixture in a dry polishing mill, and thereafter polishing the mixture to include the leafing agent.

7. The method of making aluminum coated mica particles, comprising the steps of mixing mica particles and aluminum powder in a ball mill, adding to the mixture a wet grinding solvent, grinding the mixture until said mica particles are partly coated with aluminum, adding a leafing agent to the wet grinding solvent in the mixture, and finally grinding the mixture until the mica particles are completely coated with aluminum.

8. The method of making a pigment for coating compositions, including a solvent vehicle comprising the steps of mixing mica particles and aluminum powder in a ball mill, adding to the mixture a wet grinding solvent which is not incompatible with the solvent vehicle in the coating composition, grinding the mixture until said mica particles are partly coated with aluminum, adding a leafing agent to the wet grinding solvent in the mixture, and finally grinding the mixture until the mica particles are completely coated with aluminum.

9. The method of making aluminum coated mica particles which comprises mixing mica particles and aluminum powder and subjecting the mixture to an impaction force by a movable element to wipe the mica on its surfaces with aluminum and coat the mica.

GILES B. COOKE.
FRANK J. GAVIN.